(12) United States Patent
Gumpina et al.

(10) Patent No.: US 10,464,512 B2
(45) Date of Patent: Nov. 5, 2019

(54) BEAM WITH TORSIONAL DEFORMATION AND MULTI-GEOMETRY CROSS-SECTION

(71) Applicant: SABIC GLOBAL TECHNOLOGIES B.V., Bergen op Zoom (NL)

(72) Inventors: Krishna Kishore Gumpina, Bangalore (IN); Tushar Baviskar, Bangalore (IN)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 5 days.

(21) Appl. No.: 15/748,199

(22) PCT Filed: Jul. 29, 2016

(86) PCT No.: PCT/IB2016/054583
§ 371 (c)(1),
(2) Date: Jan. 29, 2018

(87) PCT Pub. No.: WO2017/021856
PCT Pub. Date: Feb. 9, 2017

(65) Prior Publication Data
US 2018/0215331 A1  Aug. 2, 2018

Related U.S. Application Data

(60) Provisional application No. 62/199,279, filed on Jul. 31, 2015.

(51) Int. Cl.
*B60R 19/18* (2006.01)
(52) U.S. Cl.
CPC ........ *B60R 19/18* (2013.01); *B60R 2019/182* (2013.01); *B60R 2019/1846* (2013.01)
(58) Field of Classification Search
CPC ............. B60R 19/18; B60R 2019/182; B60R 2019/1846; B60R 19/34
(Continued)

(56) References Cited

U.S. PATENT DOCUMENTS 5,269,574 A * 12/1993 Bhutani ................. B60R 19/18
  293/102
6,709,036 B1   3/2004 Evans
(Continued)

FOREIGN PATENT DOCUMENTS

CN   201597538 U   10/2010
CN   203211235 U    9/2013
(Continued)

OTHER PUBLICATIONS

International Search Report for International Application No. PCT/IB2016/054583; International Filing Date: Jul. 29, 2016; dated Nov. 2, 2016; 6 Pages.
(Continued)

*Primary Examiner* — Pinel E Romain
(74) *Attorney, Agent, or Firm* — Cantor Colburn LLP

(57) ABSTRACT

A beam configured to couple to a vehicle includes end areas comprising end midpoints that are equidistant from a top face and a bottom face on a vertical axis when the beam is positioned on a vehicle, and a central area positioned between the end areas, the central area having a central area midpoint that is equidistant from the top face and the bottom face on the vertical axis when the beam is positioned on a vehicle and that is positioned in the center of the beam along the longitudinal axis. The longitudinal axis of the beam passes through the end area, wherein the central area is capable of rotating about the longitudinal axis when the beam is impacted by an applied force.

17 Claims, 12 Drawing Sheets

(58) Field of Classification Search
USPC .................. 293/102, 120, 121, 132, 133
See application file for complete search history.

(56) References Cited

U.S. PATENT DOCUMENTS

| | | | | |
|---|---|---|---|---|
| 6,712,410 | B2* | 3/2004 | Kudelko | B60R 19/18 |
| | | | | 293/102 |
| 6,832,795 | B2* | 12/2004 | Bastien | B60R 19/12 |
| | | | | 293/120 |
| 6,874,831 | B1* | 4/2005 | Pouget | B60R 19/12 |
| | | | | 293/115 |
| 6,932,201 | B2* | 8/2005 | Akiyama | B60R 19/22 |
| | | | | 188/371 |
| 7,234,741 | B1* | 6/2007 | Reynolds | B60R 19/48 |
| | | | | 293/117 |
| 7,772,839 | B2* | 8/2010 | Watson | B60R 21/0136 |
| | | | | 324/228 |
| 9,868,411 | B2* | 1/2018 | Fuerst | B60R 19/18 |
| 2003/0141729 | A1* | 7/2003 | Burkhardt | B60R 19/34 |
| | | | | 293/133 |
| 2004/0169380 | A1 | 9/2004 | Bladow et al. | |
| 2007/0257497 | A1* | 11/2007 | Heatherington | B60R 19/18 |
| | | | | 293/120 |
| 2010/0109354 | A1 | 5/2010 | Agrahari et al. | |
| 2011/0175380 | A1* | 7/2011 | Kamiya | B60R 19/023 |
| | | | | 293/133 |
| 2012/0104778 | A1 | 5/2012 | Mana et al. | |
| 2013/0175813 | A1 | 7/2013 | Mana et al. | |
| 2017/0253204 | A1* | 9/2017 | Venkat | B60R 19/18 |
| 2018/0370470 | A1* | 12/2018 | Hultkvist | B60R 19/34 |

FOREIGN PATENT DOCUMENTS

| | | |
|---|---|---|
| DE | 102004024159 A1 | 12/2004 |
| WO | 2009154471 A1 | 12/2009 |
| WO | 2012056349 A1 | 5/2012 |

OTHER PUBLICATIONS

Machine Translation of DE102004024159; Date of Publication: Dec. 9, 2004; 6 Pages.

Written Opinion of the International Searching Authority for International Application No. PCT/IB2016/054583; International Filing Date: Jul. 29, 2016; dated Nov. 2, 2016; 5 Pages.

Machine Translation of CN201597538U; Date of Publication: Oct. 6, 2010; 8 Pages.

Machine Translation of CN203211235U; Date of Publication: Sep. 25, 2013; 6 Pages.

* cited by examiner

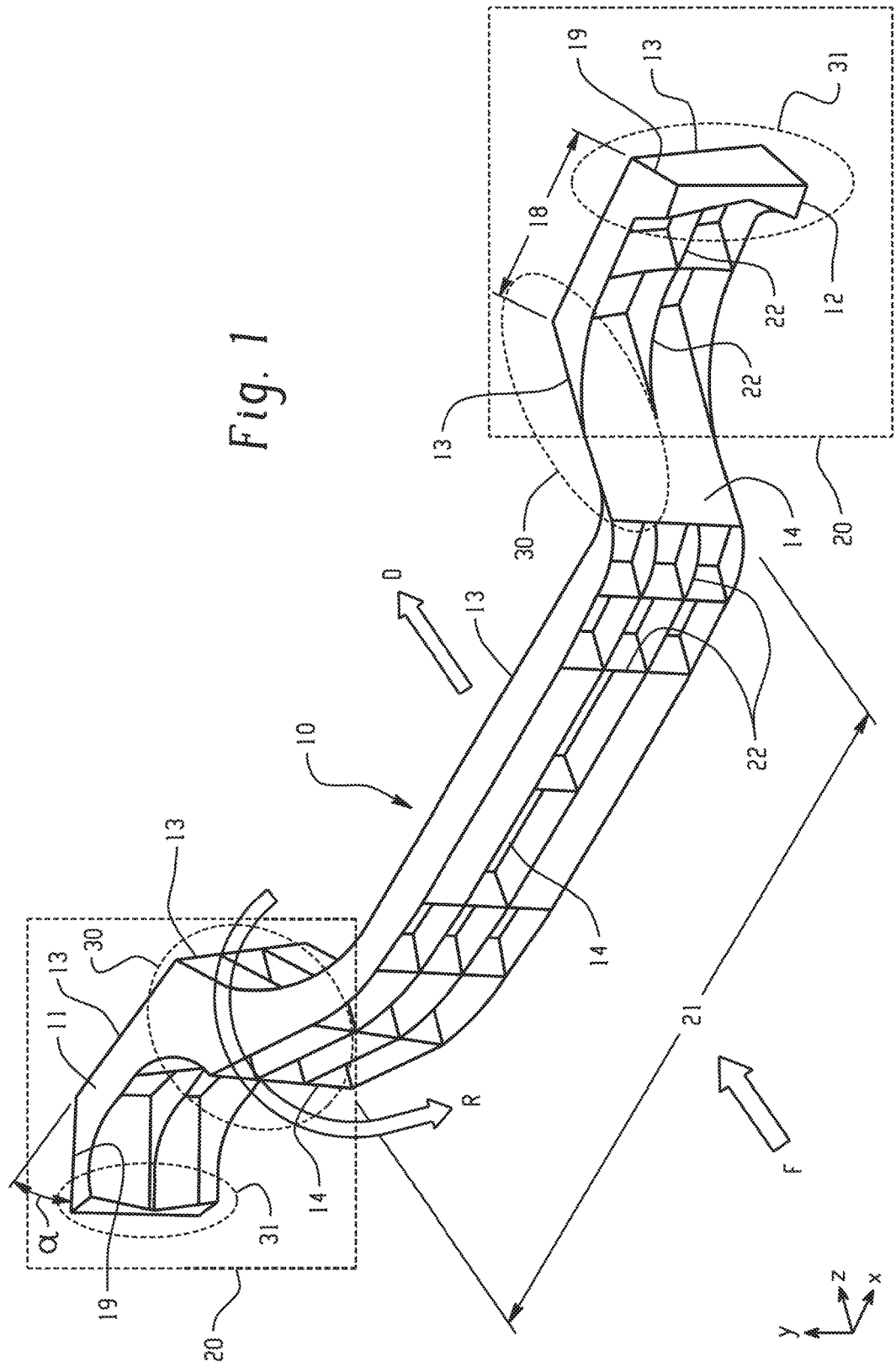

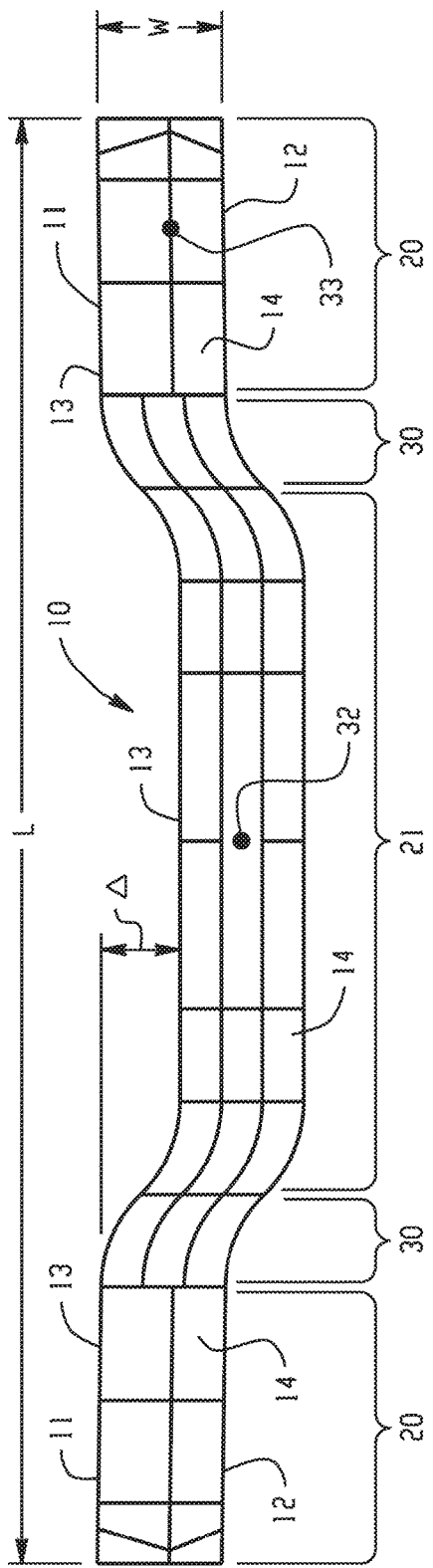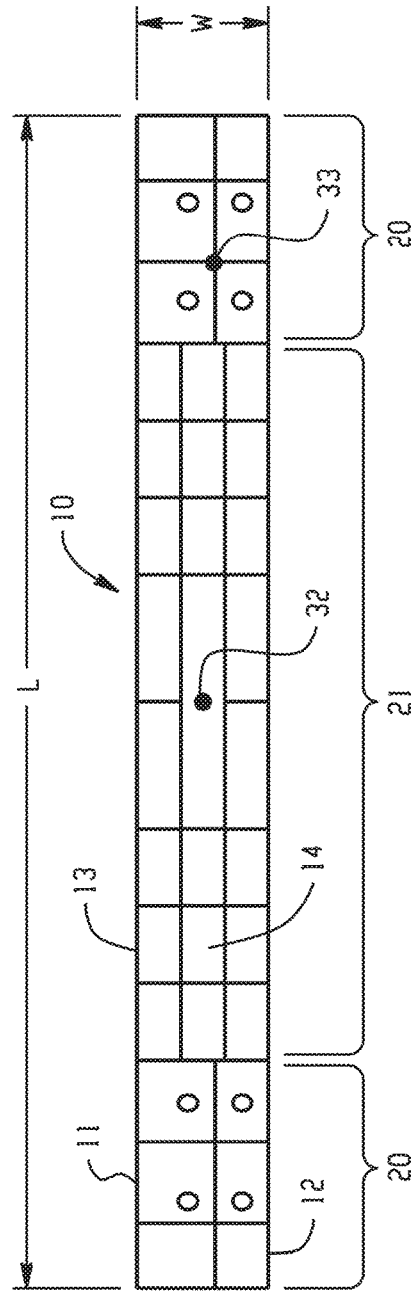

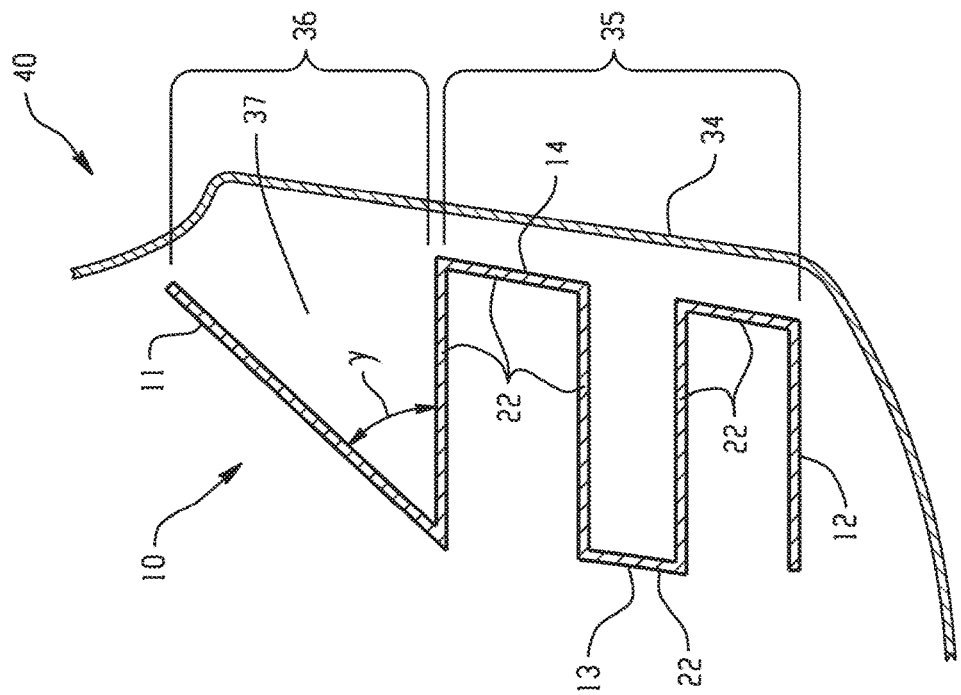
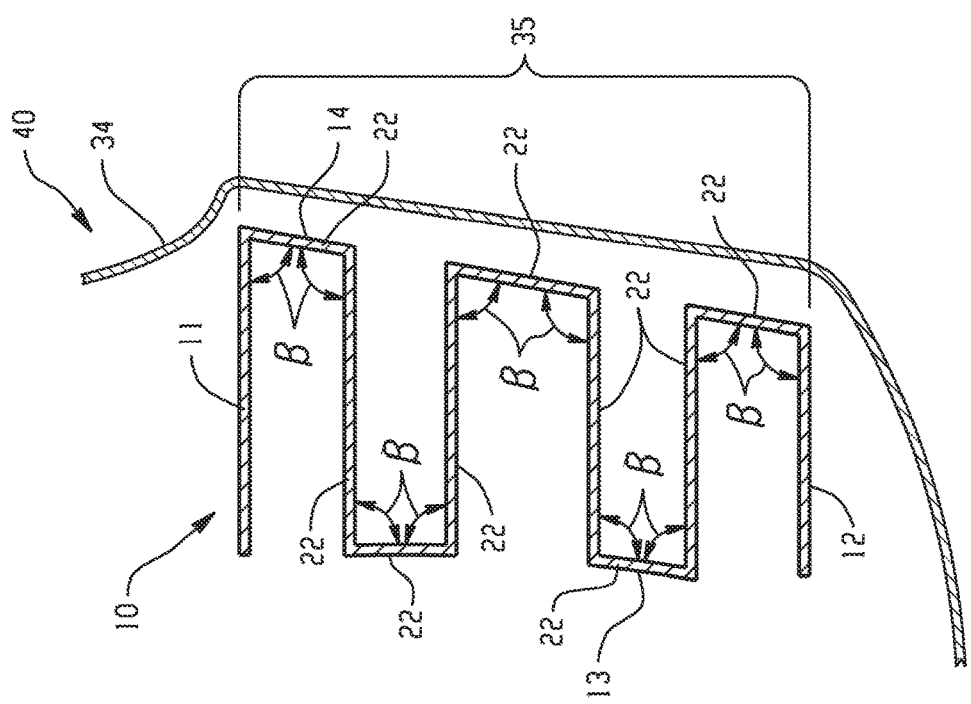

BEAM WITH TORSIONAL DEFORMATION AND MULTI-GEOMETRY CROSS-SECTION

CROSS REFERENCE TO RELATED APPLICATIONS

This application is a 371 of International Application No. PCT/IB2016/054583, filed Jul. 29, 2016, which claims priority to U.S. Application Ser. No. 62/199,279 filed Jul. 31, 2015 which are incorporated herein by reference in their entirety.

BACKGROUND

Bumper systems for automotive vehicles can include a beam that extends widthwise across the front or rear of a vehicle and that can be mounted to rails that extend in a lengthwise direction and optionally an energy absorber.

Bumper systems can include a fascia for covering the beam and/or energy absorber. There are many specifications and regulations which a bumper system can be subjected, including regional safety specifications and standards and internal development specifications, such as spatial constraints and weight limitations. Bumper systems that are lightweight are in demand to current vehicle styling trends.

To meet today's vehicle styling trends, there exists a need for bumper systems that are lightweight and capable of performing within desired specifications, standards, and regulations. Traditional bumper systems do not address these needs.

BRIEF DESCRIPTION

The above described and other features are exemplified by the following figures and detailed description.

Disclosed, in various embodiments, are lightweight beams that can be used in bumper assemblies and related methods.

A beam configured to couple to a vehicle, comprises: a first end area comprising a first end midpoint equidistant from a top face and a bottom face on a vertical axis when the beam is positioned on the vehicle; a second end area comprising a second end midpoint equidistant from the top face and the bottom face on the vertical axis when the beam is positioned on the vehicle; a central area positioned between the first end area and the second end area, the central area having a central area midpoint that is equidistant from the top face and the bottom face on the vertical axis when the beam is positioned on the vehicle 38 and that is positioned in the center of the beam along a longitudinal axis; an inner surface; and an outer surface; wherein the longitudinal axis of the beam passes through the first end area and the second end area; wherein the central area is capable of rotating about the longitudinal axis when the beam is impacted by an applied force.

A beam configured to couple to a vehicle, comprising: a first end area comprising a first end midpoint equidistant from the top face and the bottom face on a vertical axis when the beam is positioned on the vehicle; a second end area comprising a second end midpoint equidistant from the top face and the bottom face on the vertical axis when the beam is positioned on the vehicle; a central area positioned between the first end area and the second end area, the central area having a central area midpoint that is equidistant from the top face and the bottom face on the vertical axis when the beam is positioned on the vehicle; wherein the longitudinal axis of the beam passes through the first end area and the second end area, and optionally a fascia positioned to substantially envelop the beam; wherein a cross-section of the beam taken along a line from the inner surface to the outer surface varies along the length of the beam.

BRIEF DESCRIPTION OF THE DRAWINGS

The following is a brief description of the drawings, wherein the like elements are numbered alike and which are presented for the purposes of illustrating the exemplary embodiments disclosed herein and not for the purposes of limiting the same.

FIG. 1 is an isometric view of an embodiment of a bumper beam.

FIG. 2 is a front view of the beam depicted in FIG. 1.

FIG. 3 is a front view of an embodiment of a beam.

FIG. 4 is a cross-sectional view of an embodiment of a bumper system.

FIG. 6 is a cross-sectional view of an embodiment of a bumper system.

DETAILED DESCRIPTION

Figure 5:
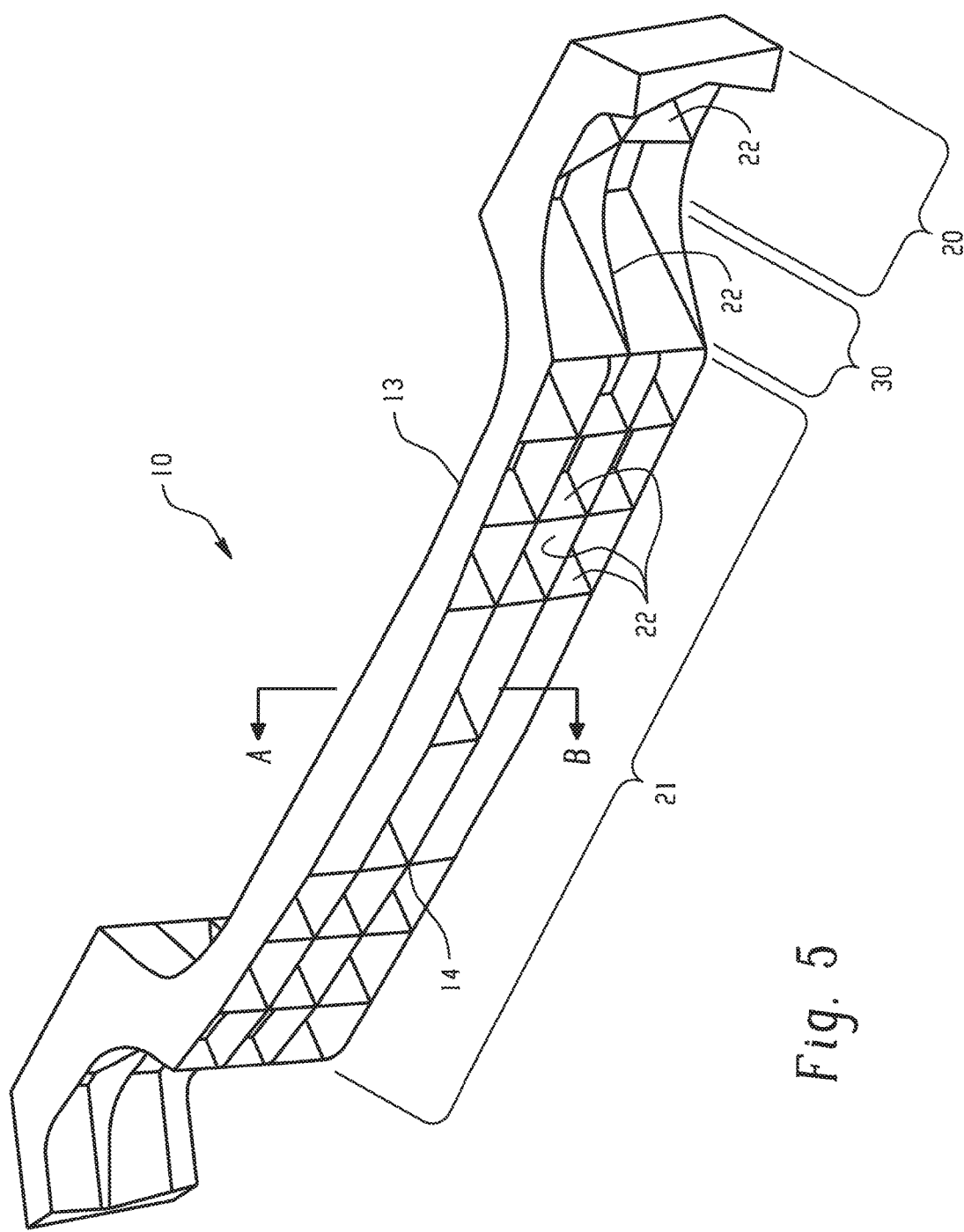
FIG. 5 is an isometric view of an embodiment of a bumper beam.

Disclosed herein, in various embodiments, are beams for bumper systems that can be used in automotive vehicles, for example as a component of a multi-part vehicle bumper system. The beams of the present disclosure can be lightweight and can have increased stiffness, and can utilize less packing space than a bumper system comprising a metal bumper beam with an energy absorber in front of the beam, between the beam and a fascia. The beams and bumper systems including the beams disclosed herein can also reduce the damage incurred by a vehicle in a vehicle-tovehicle or vehicle-to-impactor impact such that the bumper systems can enable the vehicle to meet low speed vehicle damageability standards.

Bumper systems incorporating beams of the present disclosure can conform to desired space constraints while meeting ECE-42 and/or R-CAR standards and specifications. The Research Council for Automobile Repair (herein "R-CAR") test program is used by several test houses in Europe, Asia, and South America and specifies that front and rear bumper systems of a vehicle meet certain criteria under standardized test conditions. R-CAR assessment of bumper performance is aimed at encouraging manufacturers to design bumper systems that meet a variety of goals, including systems that protect vehicle corners at low speed impact and that have desirable energy absorption. The R-CAR test impacts the bumper member with a solid barrier at a designated speed and seeks a non-destructive bending of the bumper beam along with prevention of damage to the underlying vehicle. In addition, bumper systems can be subject to the Economic Commission for Europe Regulation Number 42 ("ECE-R42"), which specifies that a car's safety systems should continue to operate normally after the car has been impacted by a pendulum or moving barrier under simulated collisions at certain speeds and at certain locations on the bumper assembly. It has been discovered that in order to satisfy RCAR and ECE-R42 criteria, a rear beam having high stiffness at the corners and high stiffness in the center can be desirable.

Bumper systems including beams of the present disclosure can satisfy R-CAR, including for example low speed damageability insurance tests such as R-CAR Section 0031, and/or ECE-R42 criteria, such as low speed damageability regulation ECE-42 Section 0031. In an embodiment, a bumper system including a beam of the present disclosure can absorb a corner impact at 2.5 kilometers per hour (kph) when coupled to a vehicle weighing 500 to 2,000 kilograms (kg), for example, 900 to 1,600 kg, with an intrusion of less than or equal to 140 millimeters (mm), where intrusion refers to the amount the beam intrudes into the passenger compartment of the vehicle. The beams of the present disclosure can have higher stiffness than conventional beams, and can have lower levels of intrusion. In an embodiment, a bumper system including a beam of the present disclosure can absorb a center pendulum impact at 4 kph when coupled to a vehicle weighing 500 to 2,000 kg, for example, 900 to 1,600 kg, with an intrusion of less than or equal to 140 mm. In an embodiment, a bumper system including a beam of the present disclosure can absorb an outboard impact at 4 kph when coupled to a vehicle weighing 500 to 2,000 kg, for example, 900 to 1,600 kg, with an intrusion of less than or equal to 140 mm.

Turning now the figures, FIG. 1 is an isometric view of a beam 10. The beam 10 can include a top face 11 and a bottom face 12, each face extending along a longitudinal axis x (e.g., horizontal axis) of the beam 10. The bottom face 12 is oriented toward the road when the bumper is assembled onto a vehicle. The beam further includes an inner surface 13 oriented toward the vehicle and an outer surface 14 disposed opposite the inner surface 13 (i.e., away from the vehicle, oriented toward a fascia). The inner surface 13 can have a greater total solid surface area than the outer surface 14.

The beam 10 can include two end areas 20 and a central area 21 disposed between the two end areas 20. The end areas 20, when the beam 10 is positioned on a vehicle, can be approximately the same size and approximately the same distance from the road. The beam 10 can include a plurality of ribs 22. As shown in FIG. 1, the plurality of ribs 22 can extend between the inner surface 13 and the outer surface 14, and can be oriented horizontally, vertically, or diagonally. Ribs 22 can be positioned such that they are parallel, perpendicular, or diagonal to the outer surface 14. Optionally, the ribs 22 can intersect other ribs 22. A stiffness of the beam 10 can be tailored to meet various standards depending upon several variables, such as the number of ribs, the thickness of ribs, and the type of material. Edges of the ribs 22 can form part of an edge of the beam 10, such as a part of the inner surface 13, or the outer surface 14.

The inner surface 13 can vary in relative position along the horizontal axis, x, of the beam 10. The inner surface 13 can vary in relative position along a vertical axis, y, of the beam 10. The end areas 20 of beam 10 can be positioned such that they are disposed closer to the vehicle than the central area 21. In other words, the central area 21 can be located further from the vehicle than either or both of the end areas 20. The beam 10 can optionally include transition areas 30 between the end areas 20 and the central area 21. Transition areas 30 can be curved or angled relative to the longitudinal axis, x, such that the central area 21 can be oriented closer to the ground than the end areas 20. Transition areas 30 can be curved or angled relative to the longitudinal axis, x, such that the central area 21 can be oriented a distance from the vehicle that is larger than the end areas 20. As illustrated in FIG. 1, the central area 21 is located further from the vehicle than end areas 20. However, it is to be understood that only a portion of the central area 21 can be located further from the vehicle than end areas 20 in the horizontal axis, x, or the vertical axis, y. For example, greater than or equal to 20% of the central area 21 can be located further from the vehicle than the end areas 25 in the horizontal axis, x, or the vertical axis, y, for example, greater than or equal to 50%, for example, greater than or equal to 75%, for example, greater than or equal to 85%, for example, greater than or equal to 90%, for example, greater than or equal to 95%, for example, greater than or equal to 99%. At the central area 21, the top face 11 can be planar or curved. At the central area 21, the bottom face 12 can be planar or curved. In some embodiments, top face 11 is planar in at least a portion of central area 21. In some embodiments, bottom face 11 is planar in at least a portion of central area 21. A leg 19 on the edge areas 31 can be oriented at an angle away from the central portion 18 of end areas 20. For example, the angle, α, can be 0 to 180 degrees relative to the longitudinal axis, x, of the beam 10. For example, the angle, α, can be 0 to 90 degrees.

During a collision, an impact force, F, can be applied to beam 10. Upon application of an impact force, F, the beam 10 can absorb energy through a crushing activity in a direction toward a vehicle, D. The beam 10 can absorb energy through a twisting activity by movement in a rotational direction, R when an impact force, F, is applied to the beam, 10. The beam 10 can absorb energy through a crushing activity in a direction toward a vehicle, D, and through twisting activity by movement in a rotational direction, R, when an impact force, F, is applied to the beam 10.

During a collision, an impact force can be applied directly or indirectly to the outer surface 14 of the beam 10. The beam 10 can absorb energy through a crushing action as the beam 10, at least in part, is moved toward the vehicle. The impact force can be applied indirectly to the beam 10 through fascia 34. An impact force load can be applied at various locations along the horizontal axis, x, of the beam. For example, an impact force can be applied to the central area 21, an end area 20, a transitional area 30 as depicted, for example, in FIG. 1, or a combination comprising at least one of the foregoing. When an impact force is applied, the beam 10 can absorb energy of the impact through one or more mechanisms. For example, when the central area 21 is impacted, the beam 10 can absorb energy through a crushing action, in which one or more areas of the beam 10 are moved toward the vehicle in direction D. In such an impact, the beam 10 may or may not experience deformation. In an embodiment, the beam 10 can advantageously absorb energy through torsion, as the central area 21 of the beam 10 rotates about the longitudinal axis, x, of the beam 10 in direction R when the beam is impacted by an impact force. For instance, the central area 21 can display a crushing motion and a twisting motion when an external force is applied to the beam 10, such as when a force is applied to the center of a beam through a fascia. In an embodiment, after the applied force is removed, the beam 10 can return to its original configuration. In one embodiment, the central area 21 of the beam 10 is vertically offset and the beam 10 can absorb energy through torsion. In an embodiment, the central area 21 of the beam 10 is vertically offset and the beam 10 can absorb the energy through torsion and through crushing.

FIG. 2 is a front view of the beam depicted in FIG. 1. The beam 10 can have a length, L and a width, W. As shown in FIG. 2, width, W can be uniform across the length, L of the beam 10. For example, central area 21 and end areas 20 can have the same width. It is also contemplated that the width, W can vary across the length, L of the beam 10. For example, central area 21 and end areas 20 can have different widths. For example, central area 21 can have a varying width across a length of central area 21. For example, end areas 20 can have a varying width across a length of end areas 20. Length L and width W can be selected based upon the desired performance characteristics of the bumper system. For example, the width of a beam can be greater than or equal to 50 millimeters (mm). The width W can be 50 to 300 mm. The width W can be 100 to 200 mm. The width W can be 100 to 150 mm. Length L can be any desired length for a beam in a bumper system in a particular vehicle. For example, the length L can be greater than or equal to 1,000 mm, for example, 1,300 mm.

As previously described herein, the beam 10 can include a central area 21 that can be vertically offset from the end areas 20. As shown in FIG. 1, the transition areas 30 can direct the beam 10 at an angle, α, so that the central area 21 can be vertically displaced from the end areas 20. Top edge 11 can be vertically higher or lower at the central area 21 than at the end areas 20 by offset distance Δ.

The central area 21 can include a central area midpoint 32 located in the middle of the beam both horizontally and vertically. The end areas 20 can contain one or more end area midpoints 33 located equidistant from the top face 11 and bottom face 12 of the beam 10. As illustrated in FIG. 2, in a beam 10 including a central area 21 vertically offset from the end areas 20, the central area midpoint 32 can be located at a point on the beam 10 that is lower than the end area midpoints 33. It is contemplated, however, that the central area midpoint 32 can be located at a point on the beam 10 that is higher than the end area midpoints 33. The vertical distance between the end area midpoints 33 and the central area midpoint 32 can be equal to the offset distance Δ, or can be another value. The offset distance Δ can desirably be, for example, greater than or equal to 50 mm, for example the offset distance Δ can be greater than or equal to 75 mm and less than or equal to 500 mm. For example, in a beam having a length of 1,282 mm and a width of 110 mm, offsetting the central area a distance of 75 mm relative to the longitudinal plane of the end areas can impart increased stiffness in the same deformation space relative to a beam with a vertical offset less than that described herein or an offset distance equal to zero. The offset distance can be to 1 to 4 times the width of the beam, for example, 2 to 4 times the width of the beam, for example, 3 to 4 times the width of the beam. In some embodiments, a beam can comprise more than one vertical offset.

The cross-sectional area taken across the A-B plane, i.e., the cross-section taken along a line from the inner surface 13 to the outer surface 14 depicted in FIG. 1, may or may not vary along the length of the beam 10.

FIG. 3 illustrates a beam 10 where the central area 21 is not vertically offset. In FIG. 3 a beam 10 with length L and central area midpoint 32 is shown. Beam 10 includes a central area 21 and two end areas 20. In FIG. 3, the central area 21 is not vertically offset from the end areas 20. As can be seen in FIG. 3, the beam width can be approximately uniform across the length L of the beam 10.

It is to be understood that the central area 21 can have an inner surface 13 spaced apart a distance from a vehicle, whether or not the central area 21 is vertically offset from the end areas.

Also disclosed herein is a bumper system 40 including a beam 10, and optionally a fascia 34. FIG. 4 depicts a beam 10 in cross-section taken in a line from the inner surface 13 to the outer surface 14 (across the A-B plane illustrated in FIG. 5). As is seen in FIG. 4, beam 10 can be adjacent to a fascia 34, which can envelop the beam 10 when assembled onto a vehicle as part of a bumper system 40. In a collision, an impact force can be applied directly to fascia 34.

Figure 7:
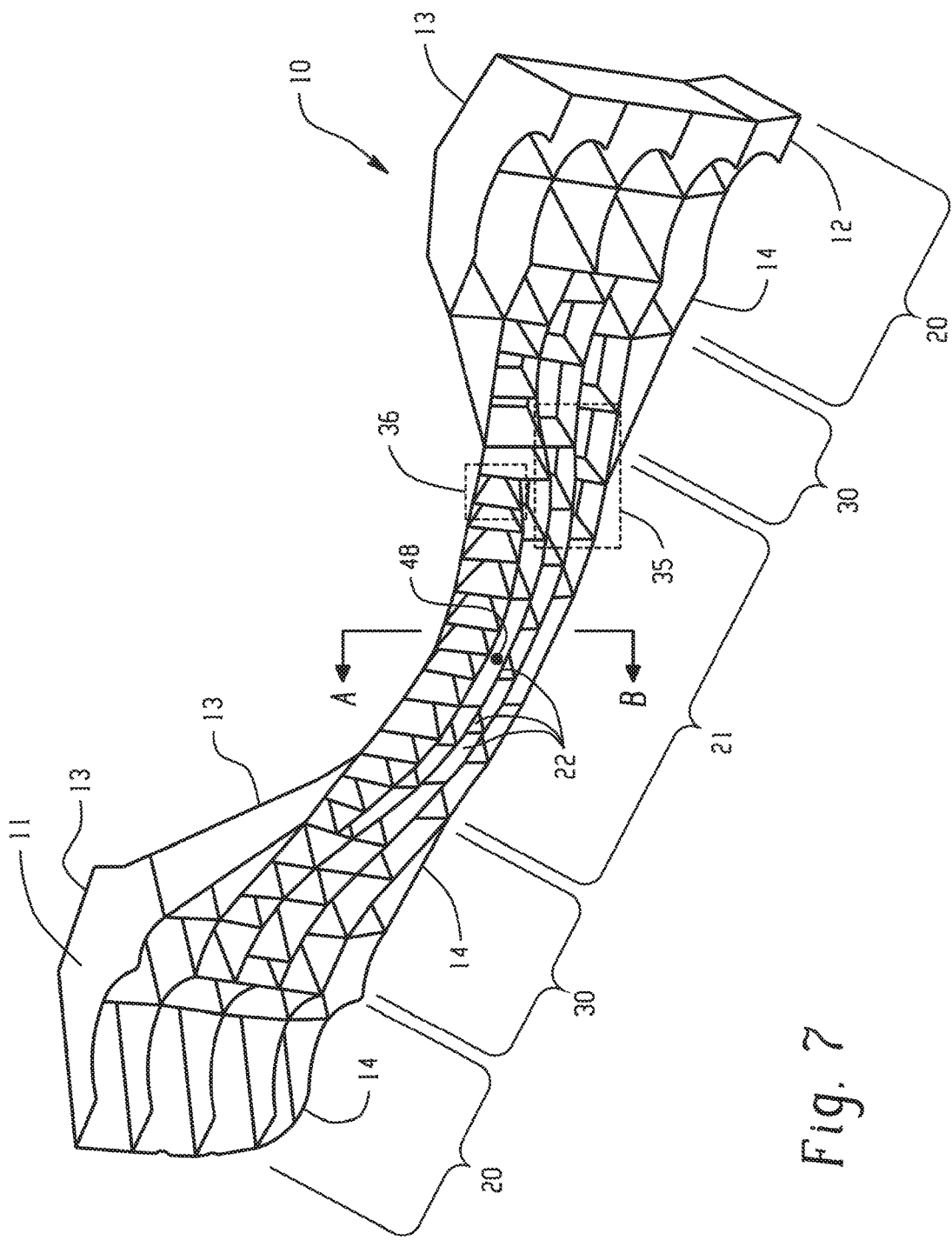
FIG. 7 is an isometric view of an embodiment of a bumper beam.

The beam 10 can form one or more geometric patterns when viewed in a cross-section taken along a line from the inner surface 13 to the outer surface 14 (across the A-B plane illustrated in FIGS. 5 and 7). For example, FIG. 4 illustrates a bumper system 40 including a beam 10 having an exemplary box shaped geometric pattern, or a box section 35. The cross-sectional area of the beam 10 across the A-B plane has a box section 35 to assist in absorbing kinetic impact energy and imparting stiffness as the impact energy is transferred through the fascia 34 and beam 10 toward the vehicle. The box section 35 can include a pattern that can be formed from ribs 22 extending between a top face 11, and a bottom face 12 and between the inner surface 13 and the outer surface 14 and can include a series of horizontal and vertical planes. The box section 35 can be formed from a sheet of material (e.g., a single sheet of material), such that it contains a series of angles β of 45 to 135 degrees when viewed across the A-B plane, for example, including an angle β of approximately 90 degrees. Angle β as illustrated in FIG. 4 can be the same or can be different from one another in any given box section 34. The box section 35 can be of rectangular or square shape, for example the box section 35 can form a series of rectangular shapes as depicted in FIG. 4. The box shape 35 can be of square shape, or of another shape that is substantially rectangular or square, such as a trapezoidal shape or a parallelogram shape. A box section 35 can include two or more rectangular shapes or square shapes stacked on top of one another, wherein the rectangles and/or squares are open on one side when viewed in cross-section.

Any number of openings on either the inner surface 13 or outer surface 14 is contemplated. For example, as illustrated in FIG. 4 a box section 35 when viewed in cross-section can have three openings on the inner surface 13 and two openings on the outer surface 14. As illustrated in FIG. 6, for example, a box section 35 can have two openings on the inner surface 13 and three openings on the outer surface 14.

The box section 35 can have open ends that alternate across the A-B plane, such that a bottom rectangle can have an open end on the inner surface 13 and the rectangle immediately above the bottom rectangle can have an open end on the outer surface 14. It is to be understood that the size and orientation of the box section 35 can be tailored to meet desired properties. It can be possible to form a section, such as a box section, with a single sheet of material, such as a sheet of thermoplastic material, molded to form the desired geometrical pattern. It can also be possible to form a section, such as a box section, with multiple sheets of material, thereby creating a multiwall sheet. A beam 10 incorporating a box section 35, can absorb energy through torsion, deformation, crushing or a combination comprising at least one of the foregoing. The box section 35 can absorb energy through a combination of torsion and deformation.

The beam can include a box section 35 in the central area 21. The beam 10 can include a box section in end areas 20. The beam 10 can include a box section in transition areas 30. Beam 10 can include a box section 35 and a central area 21 that does not include a vertical offset.

FIG. 5 is an isometric view of a beam 10 including a central area 21, transition areas 30, and end areas 20. The beam 10 can include an inner surface 13 and outer surface 14. As illustrated in FIG. 5, beam 10 can include ribs 22 disposed in the central area 21, in the transition area 30, and in the end area 20.

As shown in FIG. 1 and FIG. 7, for example, the end areas 20 can include ribs that do not form a box section 35 with open ends that alternate across the A-B plane. As is shown in FIG. 1, for instance, the end areas 20 of the beam 10 can, for example, include a series of ribs 22 the horizontal and vertical axes that form a series of boxes with openings facing the outer surface 14 and not alternating with openings on the inner surface 13. It is to be understood that beam 10 can include ribs 22 or other supports in addition a box section 35 or triangular section 36. For example, beam 10 can include ribs 22 that form vertical planes that can provide structural support to the horizontal planes of box section 35.

In an embodiment of the invention, a cross-sectional area of the beam across the A-B plane (see FIG. 5 and FIG. 7) can include a combination of geometrical patterns. FIG. 6 is a cross-sectional view taken across the A-B plane of the beam 10 depicted in FIG. 7. As shown, the cross-sectional area in the central area can have an inner surface 13, an outer surface 14, a box section 35 and a triangular section 36. The inner surface 13 can vary in relative position along the longitudinal axis x and/or the vertical axis y of the beam 10. For example, the inner surface 13 can be spaced further from the vehicle at the central area 21 than at the end areas 20. The outer surface 14 in the central area 21 can be approximately the same distance from the vehicle as the outer surface 14 in the end area 20. The triangular section 36 can include a triangle shape having an open face 37 directed toward fascia 34. The triangular section 36 can include at least one angle γ adjacent to a box section 35. The angle γ can be less than 90 degrees. Ribs 22 can be dispersed between triangular section 36 and box section 35 such that a triangular section and box section can share at least one edge. As illustrated in FIG. 6, a beam 10 can include one triangular section 36 and one box section 35. It is contemplated, however, that a beam 10 can include more than one triangular section 36 and/or more than one box section 35.

Turning back to FIG. 4, the box section 16 can include a series of horizontal planes that are angled at approximately 90 degrees relative to one or more adjacent vertical planes when viewed across the A-B plane. In some embodiments, the planes can be angled at greater than 90 degrees or less than 90 degrees. For instance, box section 16 can include sections in the shape of squares, rectangles, parallelograms, trapezoids, or a combination comprising at least one of the foregoing when viewed across the A-B plane. Such shapes can have one or more open sides or may be closed on all sides by the beam planes.

Turning to FIG. 6, the triangular section 36 can include at least one angle that is less than 90 degrees and is adjacent to and/or attached to the box section 35. The triangular section 36 can form a part of the top face 11 of the beam 10, while the box section 35 can form a part of the bottom face 12 of the beam 10. The triangular section 36 can appear in cross-section when viewed across the A-B plane as an open ended triangle, wherein the open end is on and/or forms part of the outer surface 14 of the beam 10. A combination of a box section 35 and a triangular section 36 can be present in a central area 21, a transition area 30, an end area 20, or a combination comprising at least one of the foregoing. A beam 10 can include varying cross-sectional geometric patterns along the length of the beam. For example, a beam can include a combination box sections 35 and triangular sections 36 at one point along a horizontal axis and can include a box section 35 with no triangular section 36 at another point along the horizontal axis. For instance, a beam 10 can include a central area 21 with a combination box section 35 and triangular section 36 and a transition area 30 and/or end area 20 including a box section. In another example, the central area 21 can include one or more cross-sectional areas with a combination triangular 36 and box section 35 and one or more cross-sectional areas including a box section 35 with no triangular section 36. As used herein, the phrase "combination of a box section and a triangular section" means a geometrical pattern viewed across the A-B plane including a box section 35 and a triangular section 36. The combination of a box section 35 and a triangular section 36 can reduce the total weight of the beam relative to a beam of the same spatial proportions with only a box section that does not include a triangular section. Moreover, a beam 10 including a combination of a box section 35 and a triangular section 36 can maintain the same contact area with the fascia 34 as compared to a beam containing only a box section and/or can have high stiffness at the central area 21.

When end areas 20 do not include a triangular section. When viewed along the length of the beam 10, the cross-section can vary. FIG. 7 is an isometric view of an exemplary beam 10 including a combination of a box section 35 and a triangular section 36. As is shown, central area 21 contains an outer surface 14 and an inner surface 13. Top face 11 of central area 21 forms an edge of a triangular shape, and the top edge of a triangular section 36 as depicted, for example, in FIG. 6. A box section 35 is included in central area 21 below triangular section 36. The box section 35 includes multiple ribs 22 and a bottom face 12 of the beam 10. FIG. 7 also illustrates a central area 21 that has a varying offset distance from the inner surface 13. For example, in FIG. 7, central area 21 has a greater offset distance at a centerpoint than at transition areas 30.

Stated another way, the beam 10 can have a variable width along the length of the beam. The beam 10 can have a larger cross-sectional circumference at the end areas 11 than the cross-sectional circumference in the central area 22, for example as shown in FIG. 7.

As used herein, "width" is understood to mean the distance from the top face 11 to the bottom face 12 of the beam 10 at a particular point along the longitudinal axis x. The end areas 20 can have a greater width than the central area 21. Providing end areas 20 with greater width than the width of the central area 21 can provide increased stiffness and/or increased contact area at the corner(s) of a bumper system. Such increased stiffness and/or increased contact area can aid in absorption of energy when an impact force is applied to a corner of the bumper system. For example, increased height of the end areas can provide benefits in R-CAR testing.

The cross-section of the beam 10 taken along a line from the inner surface 13 to the outer surface 14 can vary along the length of the beam. For example, the geometric pattern of the cross-section of the beam 10 can vary along the length L of the beam 10 or the cross-sectional circumference can vary along the length of the beam. The width W of the cross-section can vary along the length L of the beam 10. The relative vertical position of the beam 10 in the cross-section can vary along the length L of the beam 10.

Figure 8:
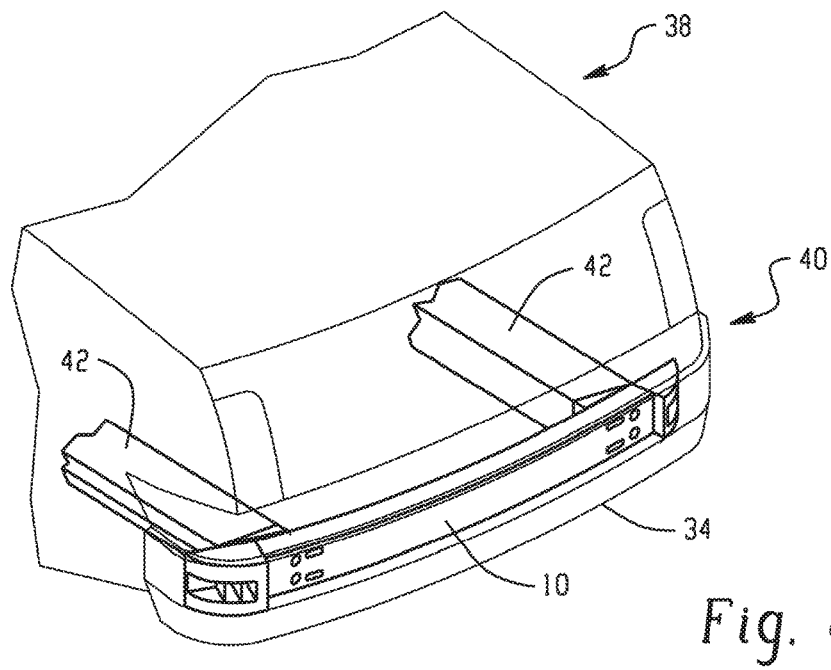
FIG. 8 is a perspective view of a bumper system assembled onto a vehicle.

FIG. 8 shows a perspective view of a front portion of a vehicle 38 having a bumper system 40 according to an embodiment of the invention. Bumper system 40 includes a bumper beam 10 in which the beam 10 is mounted to side rails 42 of a vehicle 38. Bumper system 40 optionally includes a fascia 34.

Figure 9:
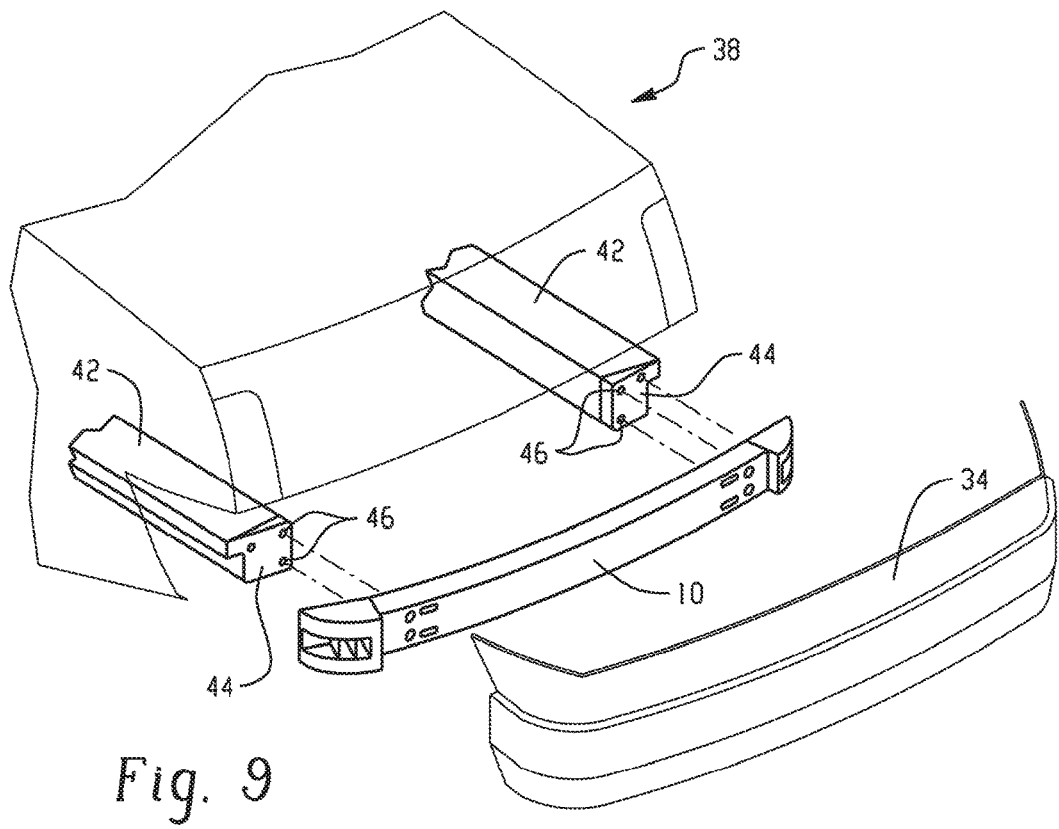
FIG. 9 is an exploded view of the bumper system of FIG. 1.

FIG. 9 is a perspective view of a front portion of a vehicle 38 having a bumper system 40 showing the connection of the bumper beam 10 attached to side rails 42. Bumper beam 10 can attach to mounting plates 44, for example using fasteners that mount the bumper beam 10 to receptors 46 of mounting plates 44. Fascia 34 can be designed to integrate the bumper assembly with the vehicle body, while also improving aerodynamics to reduce wind resistance of the vehicle 38.

The beam can be lightweight. For example, the bumper beam can weigh less than or equal to 4 kilograms (kg), for example, less than or equal to 3.5 kg, for example, less than or equal to 3 kg, for example less than or equal to 2.5 kg. In one embodiment, a beam can weigh about 2.34 kg.

Figure 10:
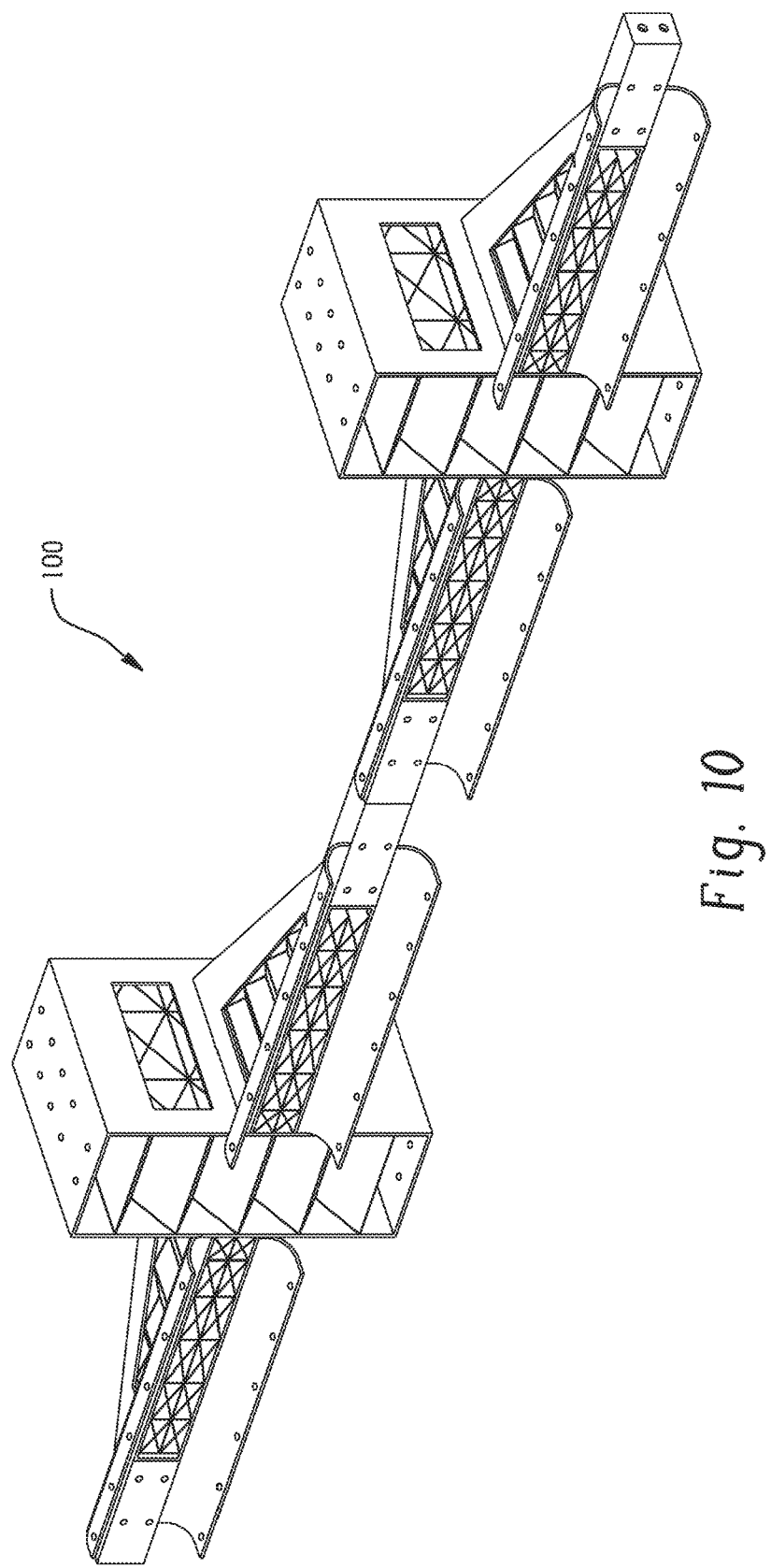
FIG. 10 is an isometric front view of an underrun protection device.

The beams disclosed herein can be disposed at a front of a vehicle or at a rear of a vehicle, for example, the beams can be front beams or rear beams. The beams are contemplated in all types of vehicles, e.g., passenger cars, trucks, buses, commercial trucks, etc. The beam can be attached to a passenger car. The beam can be attached to a truck (e.g., a commercial truck or a passenger truck). The beam can be a component of a rear bumper system of a vehicle. The beam can be a component of a front bumper system of a vehicle. The beam can be a component of a front underrun protection device 100 (see FIG. 10).

The beam can be made from any thermoformable material having the desired characteristics. For instance, the beam can comprise a thermoplastic polymer, a glass mat thermoplastic polymer (GMT), a thermoset, a composite, a metallic material, or a metallic thermoplastic polymer hybrid. The preferred characteristics of the material used to form the beam include good stiffness, high toughness/ductility, thermal stability, and high energy absorption capacity among others. Exemplary materials include thermoplastic polymers as well as combinations of thermoplastic polymers with elastomeric polymers, and/or thermoset polymers. Possible materials include acrylonitrile-butadiene-styrene (ABS); polybutylene terephthalate (PBT); polycarbonate; polycarbonate/ABS blends; copolycarbonate-polyesters; acrylic-styrene-acrylonitrile (ASA); acrylonitrile-(ethylene-polypropylene diamine modified)-styrene (AES); phenylene ether polymers; blends of polyphenylene ether/polyamide; polyamides; phenylene sulfide polymers; polyvinyl chloride (PVC); high impact polystyrene (HIPS); low/high density polyethylene (L/HDPE); polypropylene (PP); expanded polypropylene (EPP); and thermoplastic olefins (TPO). The beam can be fabricated, for example, from steel, aluminum, or a glass mat thermoplastic polymer.

Exemplary materials include XENOY™, commercially available from SABIC's Innovative Plastics Business. XENOY™ polymers are a thermoplastic alloy blend of polycarbonate (PC) with polyesters, polybutylene terephthalate (PBT), or polyethylene terephthalate (PET), particularly PBT. XENOY™ polymers are characterized by their ductility, chemical resistance, high temperature dimensional stability and mechanical strength. They also offer very good aesthetics, lubricity, UV resistance and color retention. They are designed to provide resistance to both gasoline and oils, as well as a high level of impact strength at temperatures down to −40° C. In particular, high modulus ductile (HMD) XENOY™ polymers are desirable due to their balance of high stiffness and ductility. Thermoformed XENOY™ allows for reduced packaging space compared to TPO and EPP, for example. Fillers (glass, mineral etc.) can be used to increase the modulus of a polymer. However, the addition of filler usually reduces the ductility of the polymer (as measured by elongation at break and yield in ASTM D638 tensile strain measurements). XENOY™ HMD polymers have a secondary nano-fibrillated network which enables the use of fillers to increase modulus, while still maintaining the high elongation at break of unfilled polymer that is beneficial to absorb energy. The ductility of HMD polymers is also increased significantly, as measured by notched Izod impact tests (ASTM D256). HMD polymers also provide better creep and tensile fatigue performance. These HMD polymers allow the walls of the beam to be thinner, due to the increased modulus, while still maintaining their structure in typical automotive crash test scenarios. XENOY™ X4820 can be a desirable polymer due to its balance of high stiffness and ductility. The bumper beam can be formed from combinations including at least one of any of the above-described materials.

Bumper systems including beams of the present disclosure can satisfy R-CAR standards, including for example low speed damageability insurance tests such as R-CAR Section 0031, and/or ECE-R42 criteria, such as low speed damageability regulation ECE-42 Section 0031. A bumper system including a beam of the present disclosure can absorb a corner impact at 2.5 kilometers per hour (kph) when coupled to a vehicle weighing 500 to 2,000 kg, for example, 900 to 1,600 kg, with an intrusion of less than or equal to 140 mm. The beams of the present disclosure can have higher stiffness than conventional beams, and can have lower levels of intrusion. A bumper system including a beam of the present disclosure can absorb a center pendulum impact at 4 kph when coupled to a vehicle weighing 500 to 2,000 kg, for example, 900 to 1,600 kg, with an intrusion of less than or equal to 140 mmA bumper system including a beam of the present disclosure can absorb an outboard impact at 4 kph when coupled to a vehicle weighing 500 to 2,000 kg, for example, 900 to 1,600 kg, with an intrusion of less than or equal to 140 mm.

In the RCAR 40% overlap impact test at 16 kph, the maximum force measured must be less than or equal to 110 kiloNewtons (kN). A bumper system including a beam of the present disclosure meet the RCAR 40% overlap impact test at 16 kph with a maximum force measured of less than or equal to 100 kN, for example, less than or equal to 90 kN, for example, less than or equal to 80 kN, for example, less than or equal to 70 kN.

The following examples are merely illustrative of the beams disclosed herein and are not intended to limit the scope hereof. Unless otherwise stated, all examples were based upon simulations.

EXAMPLES

Example 1

LS-DYNA software was used for all the simulations and XENOY™ resin 1103 commercially available from SABIC's Innovative Plastics business was used as the material. In this example, Sample 1 is a beam of the design depicted in FIG. 7 that is tested in ECE R42 simulations. ECE R42 specifies no failure of expensive parts for ECE R42 pendulum impacts. Expensive parts can include the beam, fascia, vehicle rails, etc. The beam is as previously described herein and includes a box section and a triangular section. In Sample 1, the walls and ribs of the beam all have a thickness of 2.5 mm. The beam is composed of XENOY™ and weighs 2.34 kg. The vehicle mass used in the simulations is approximately 902 kg. The beam is subjected to a center pendulum impact test, an outboard pendulum impact test, and a corner pendulum impact test in accordance with ECE R42.

Figure 11A:
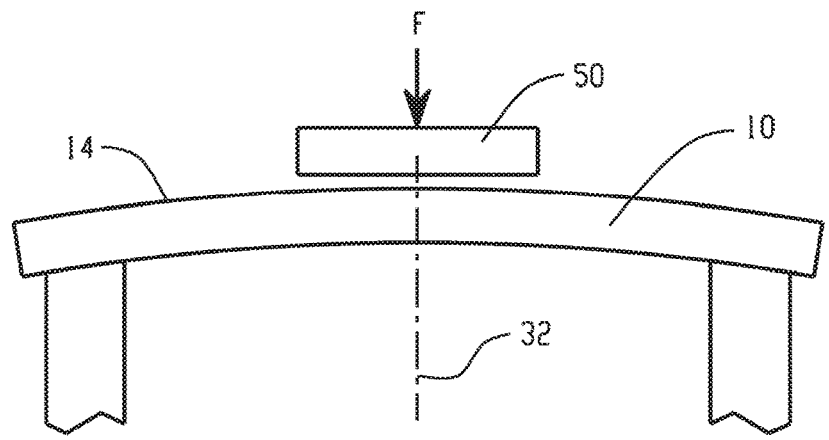
FIG. 11A is a top perspective view depicting the position of a pendulum in an ECE R 42 center pendulum impact test.
Figure 12A:
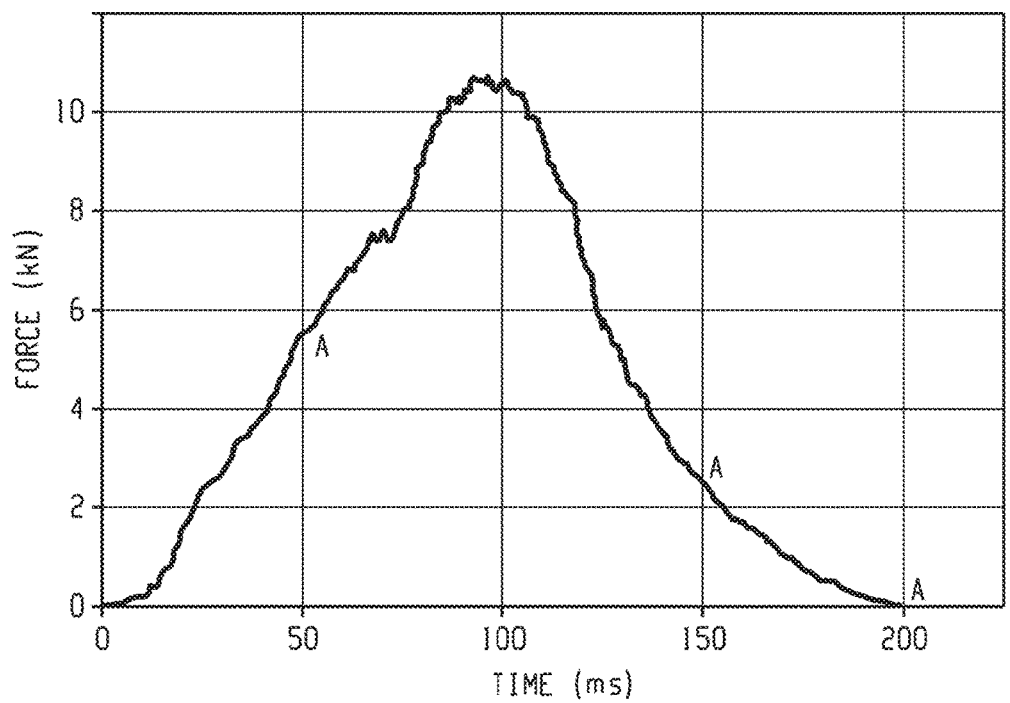
FIG. 12A is a graphic illustration of force versus time in a center pendulum impact test.
Figure 12B:
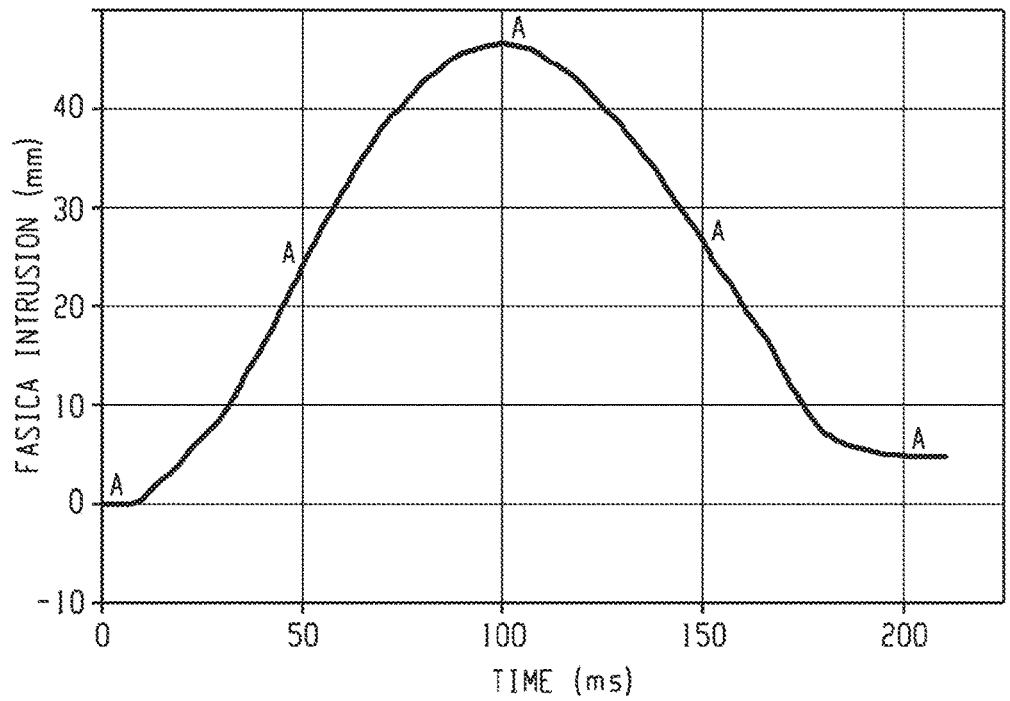
FIG. 12B is a graphic illustration of fascia intrusion versus time in a center pendulum impact test.

FIG. 11A depicts a top perspective view illustrating the relative position of a pendulum 50 in an ECE R42 center pendulum impact test. In this center pendulum impact test, the pendulum 50 applies a force F of 4.0 kph to beam 10 at the outer surface 14 at the location of the central area midpoint 32. The results of this test demonstrate a highly localized maximum strain of 20% at the central area midpoint (i.e., the beam center). Also observed is that the failure strain of the material is greater than 80% and no back panel deformation is observed. FIGS. 12A and 12B are graphical representations of the results of the center pendulum impact test. FIG. 12A shows the force in kiloNewtons (kN) versus time in miliseconds (ms). As can be seen in FIG. 12A, the maximum force is approximately 10 kN and occurs at about 100 ms, after which the force decreases. FIG. 12B shows fascia intrusion in mm versus time in ms. As can be seen in FIG. 12B, the maximum fascia intrusion is approximately 47 mm and occurs at approximately 100 ms, after which the intrusion decreases.

Figure 11B:
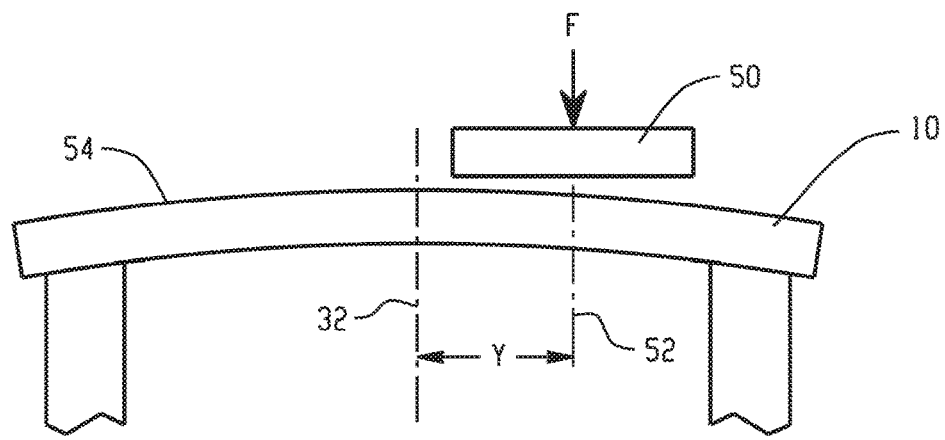
FIG. 11B is a top perspective view depicting the relative position of a pendulum in an ECE R 42 outboard pendulum impact test.
Figure 13A:
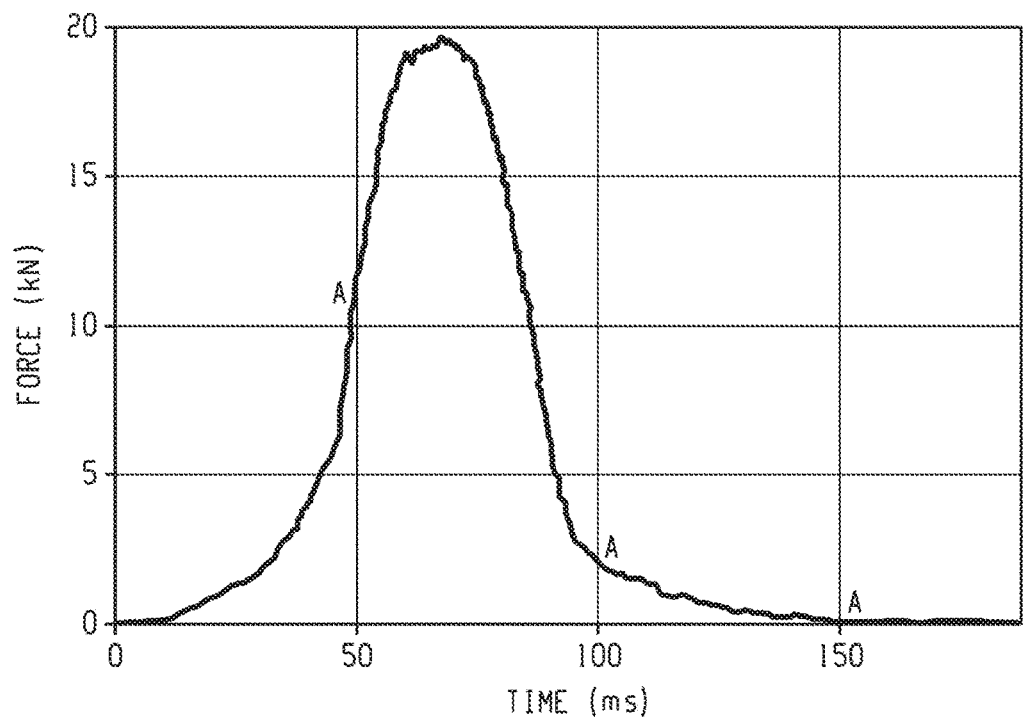
FIG. 13A is a graphic illustration of force versus time in an outboard pendulum impact test.
Figure 13B:
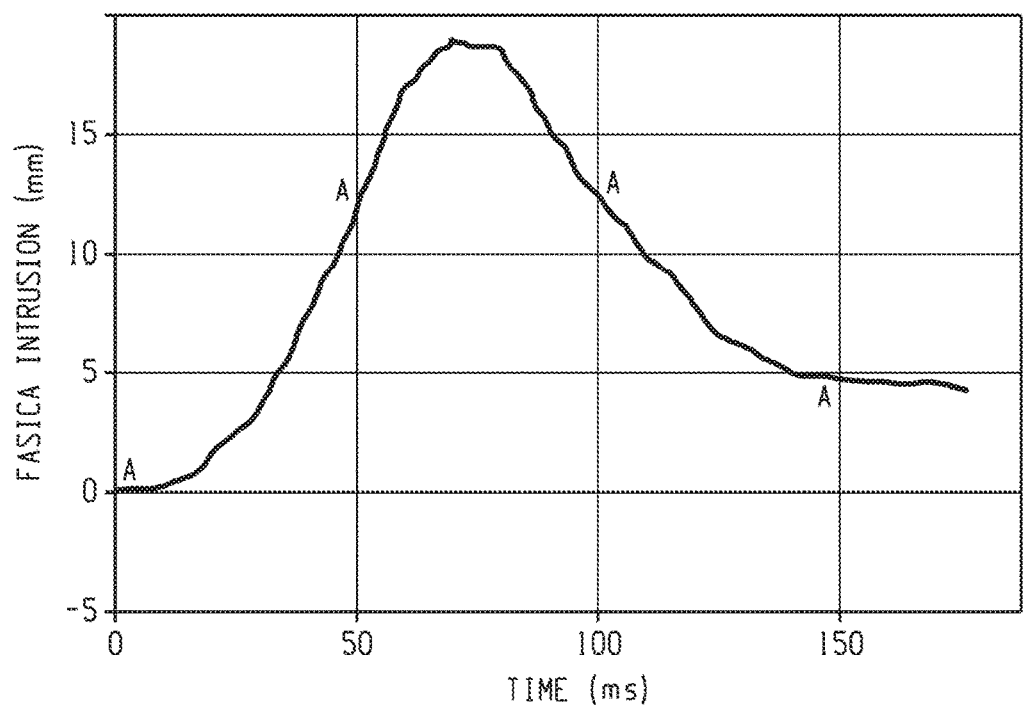
FIG. 13B is a graphic illustration of fascia intrusion versus time in an outboard pendulum impact test.

FIG. 11B is a top perspective view depicting the relative position of a pendulum 50 in an ECE R42 outboard pendulum impact test. In this outboard pendulum impact test, the pendulum 50 applies a force F of 4.0 kph to beam 10 at a pendulum midpoint 52 that is located a distance Y from the central area midpoint 32, wherein Y is equal to 300 mm. The results of this test demonstrate a highly localized maximum strain of 39% at the central area midpoint (i.e., the beam center). Also demonstrated by this test is that the failure strain of the material is greater than 80%. Further, no back panel deformation is observed. FIGS. 13A and 13B are graphical representations of the results of the outboard pendulum impact test. FIG. 13A shows the force (kN) versus time (ms). As can be seen in FIG. 13A, the maximum force occurs at approximately 70 ms and is approximately 19 kN. FIG. 13B shows fascia intrusion (mm) versus time (ms). As can be seen in FIG. 13B, the maximum fascia intrusion is approximately 19 mm and occurs at approximately 75 ms, after which the intrusion decreases.

Figure 11C:
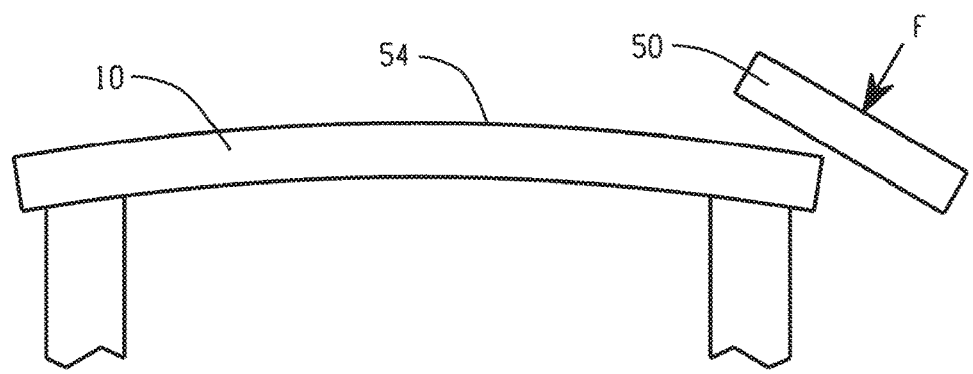
FIG. 11C is a top perspective view depicting the position of a pendulum in an ECE R 42 corner pendulum impact test.
Figure 14A:
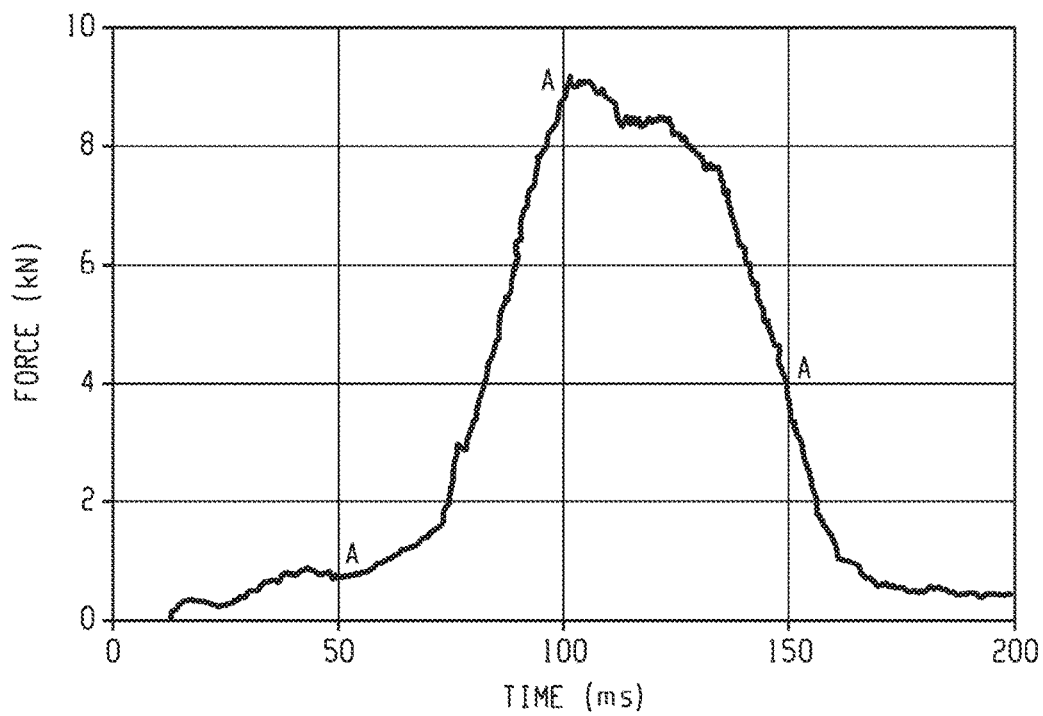
FIG. 14A is a graphic illustration of force versus time in a corner pendulum impact test.
Figure 14B:
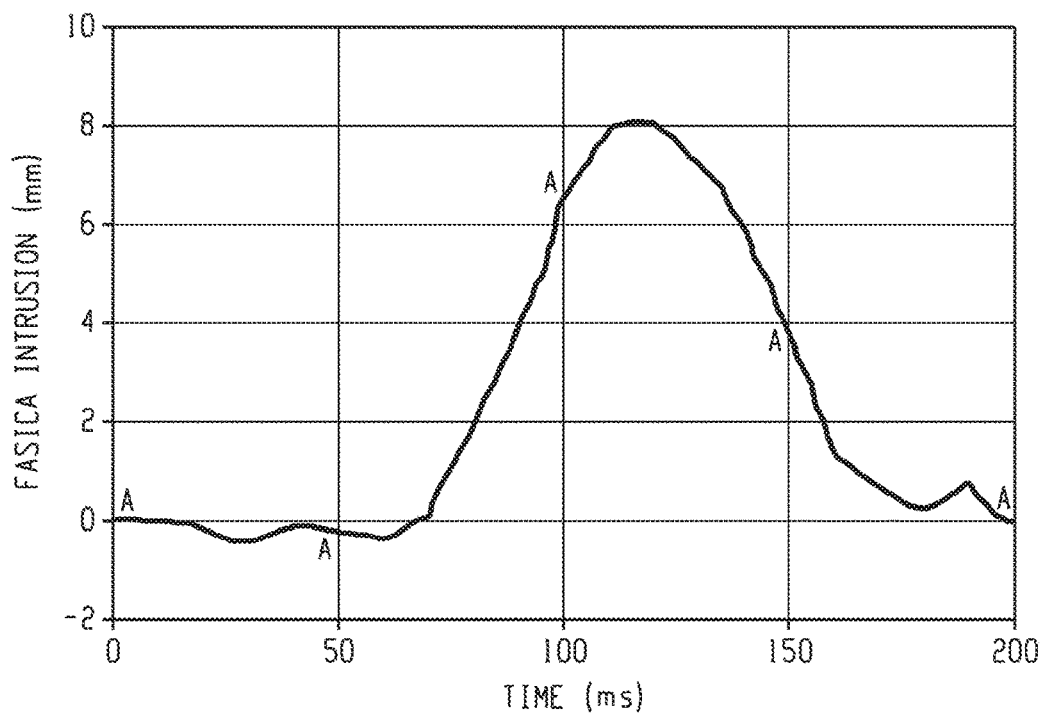
FIG. 14B is a graphic illustration of fascia intrusion versus time in a corner pendulum impact test.

FIG. 11C is a top perspective view depicting the position of a pendulum 50 in an ECE R42 corner pendulum impact test. In this corner pendulum impact test, pendulum 50 applies a force F of 2.5 kph to the beam 10 at beam corner 54. FIGS. 14A and 14B are graphical representations of the results of the corner pendulum impact test. FIG. 14A shows the force in kN versus time in ms. As can be seen in FIG. 14A, the maximum force is approximately 9 kN at approximately 100 ms. FIG. 14B shows fascia intrusion in mm versus time in ms. As can be seen in FIG. 14B, the maximum fascia intrusion is approximately 8 mm occurring at about 120 ms, after which time the maximum intrusion decreased.

The results of the center pendulum impact, outboard pendulum impact, and corner impact demonstrate that a beam having the design disclosure in FIG. 7 performs well in ECE R42 tests with minimal damage to components of the vehicle. An advantageous result observed from the test illustrates that no plastic strain is observed in the inner surface of the beam for the center pendulum impact.

Example 2

Figure 15:
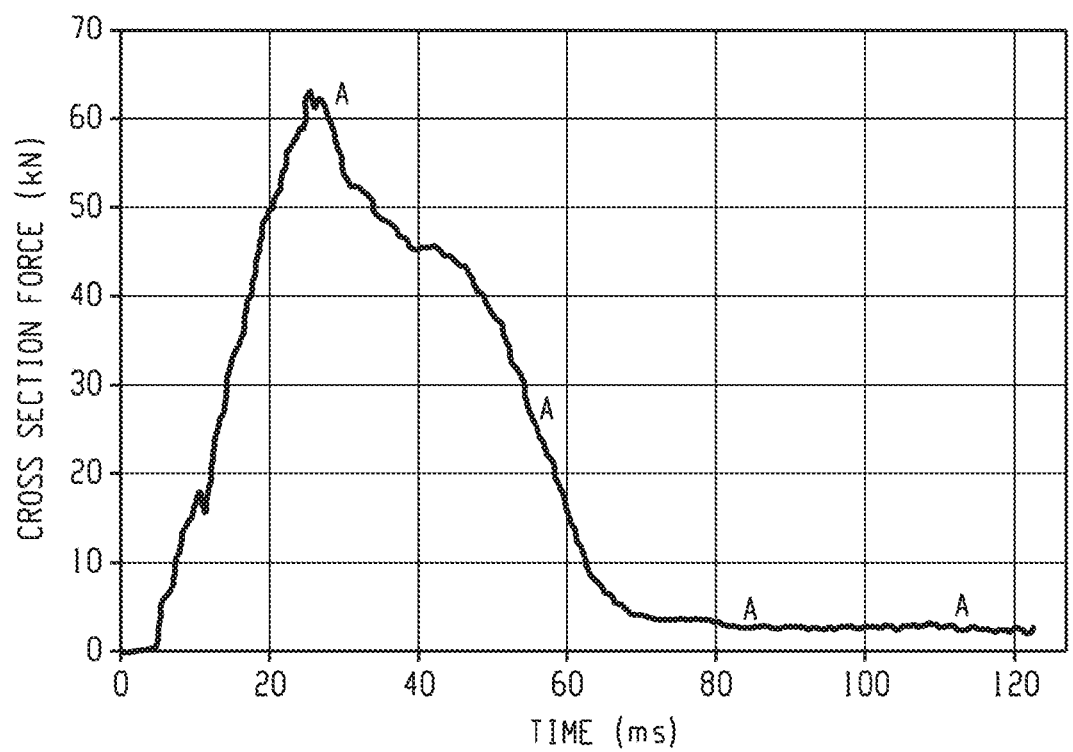
FIG. 15 is a graphical illustration of results of a RCAR 40% overlap impact test.

In this example, Sample 2 is a beam of the design shown in FIG. 7 that is subjected to a simulated RCAR test. The beam is as previously described herein with respect to FIG. 7 and includes a box section and a triangular section. In Sample 2, the walls and ribs of the beam all have a thickness of 2.5 mm. The beam is composed of XENOY™ and weighs 2.34 kg. The vehicle mass is approximately 902 kg. In this RCAR simulation, RCAR regulations provide that a maximum force should not exceed 110 kN during a 16 kph RCAR 40% overlap impact. During the simulation of Sample 2, it is observed that less than half of the total depth of the end area (e.g., crash can) is crushed. Slight deformation of the inner surface is observed, but the outer surface of the end area does not display major deformation. The deformation is within the acceptable limits. FIG. 15 is a graphical illustration of the cross-section force in kN versus time in ms in the RCAR 40% overlap test. In the RCAR test in Sample 2, the beam displays a maximum force of approximately 63 kN and a maximum intrusion of approximately 120 mm. Thus, the beam absorbs a significant amount of energy, therefore desirably displaying low levels of force less than or equal to 63 kN.

The beams disclosed herein can meet the requirements set forth by various regulations for vehicles. For example, the beams disclosed herein can absorb a large amount of energy such that force levels experienced by the beam are less than or equal to 63 kN during RCAR tests, which is nearly 50% less than allowed under the regulation of 110 kN. The beams disclosed herein can provide increased surface area at the end areas of the beam in order to provide further energy absorbing capabilities to the beam. The use of box sections can impart reduced weight and maintain stiffness of the beam to pass the requirements set forth by the ECR 42 impacts. The use of triangular sections can impart reduced weight and maintain stiffness of the beam to pass the requirements set forth by the ECR 42 impacts. The use of box sections and triangular sections can impart reduced weight and maintain stiffness of the beam to pass the requirements set forth by the ECR 42 impact test. For example, the beams disclosed herein can have no plastic strain in the outer surface of the beam during the center pendulum impact test, which is an important impact test in ECE R42.

The beams and bumper systems disclosed herein include at least the following embodiments:

Embodiment 1

A beam configured to couple to a vehicle, comprising: a first end area comprising a first end midpoint equidistant from a top face and a bottom face on a vertical axis when the beam is positioned on the vehicle; a second end area comprising a second end midpoint equidistant from the top face and the bottom face on the vertical axis when the beam is positioned on the vehicle; a central area positioned between the first end area and the second end area, the central area having a central area midpoint that is equidistant from the top face and the bottom face on the vertical axis when the beam is positioned on the vehicle 38 and that is positioned in the center of the beam along a longitudinal axis; an inner surface; and an outer surface; wherein the longitudinal axis of the beam passes through the first end area and the second end area; wherein the central area is capable of rotating about the longitudinal axis when the beam is impacted by an applied force.

Embodiment 2

The beam according to claim 1, wherein a cross-section portion of the beam taken along a line from the inner surface to the outer surface varies along the length of the beam.

Embodiment 3

The beam according to any of claims 1-2, wherein the central area comprises a cross-sectional geometry comprising a box section, a triangular section, or a combination comprising at least one of the foregoing.

Embodiment 4

The beam according to any of the preceding claims, wherein the central area is vertically offset from the end areas.

Embodiment 5

The beam according to any of the preceding claims, wherein the beam has a width that varies along the length of the beam.

Embodiment 6

The beam according to any of the preceding claims, wherein at least one end area has a greater width than the width of the central area when measured from the inner surface to the outer surface at a point along the longitudinal axis.

Embodiment 7

A beam configured to couple to a vehicle, comprising: a first end area comprising a first end midpoint equidistant from the top face and the bottom face on a vertical axis when the beam is positioned on the vehicle; a second end area comprising a second end midpoint equidistant from the top face and the bottom face on the vertical axis when the beam is positioned on the vehicle; a central area positioned between the first end area and the second end area, the central area having a central area midpoint that is equidistant from the top face and the bottom face on the vertical axis when the beam is positioned on the vehicle; wherein the longitudinal axis of the beam passes through the first end area and the second end area, and optionally a fascia positioned to substantially envelop the beam; wherein a cross-section of the beam taken along a line from the inner surface to the outer surface varies along the length of the beam.

Embodiment 8

The beam according to claim 7, wherein the central area is capable of rotating about a longitudinal axis when the beam is impacted by an applied force.

Embodiment 9

The beam according to any of the preceding claims, wherein the beam comprises a thermoplastic polymer, a glass mat thermoplastic polymer, a thermoset, a composite, a metallic material, a metallic plastic hybrid, or a combination comprising at least one of the foregoing.

Embodiment 10

The beam according to claim 9, wherein the beam comprises a thermoplastic polymer.

Embodiment 11

The beam according to claim 10, wherein the thermoplastic polymer is selected from acrylonitrile-butadiene-styrene; polybutylene terephthalate; polycarbonate; copolycarbonate-polyesters; acrylic-styrene-acrylonitrile; acrylonitrile-(ethylene-polypropylene diamine modified)-styrene; phenylene ether polymers; polyamides; phenylene sulfide polymers; polyvinyl chloride; polystyrene; polyethylene; polypropylene; thermoplastic olefins, or a combination comprising at least one of the foregoing.

Embodiment 12

The beam according to claim 11, wherein the thermoplastic polymer is a blend of polycarbonate and polybutylene terephthalate.

Embodiment 13

The beam according to any of the preceding claims, wherein the beam is configured to attach to a rear of a vehicle to absorb energy upon impact.

Embodiment 14

The beam according to any of the preceding claims, wherein the beam is configured to attach to a front of a vehicle to absorb energy upon impact.

Embodiment 15

A bumper system comprising: a beam according to any of the preceding claims; and optionally, a fascia.

Embodiment 16

The bumper system of claim 15, wherein the beam comprises a thermoplastic polymer, a glass mat thermoplastic polymer, a thermoset, a composite, a metallic material, a metal plastic hybrid, or a combination comprising at least one of the foregoing.

Embodiment 17

The bumper system of any of claims 15-16, wherein the system is a front bumper system.

Embodiment 18

The bumper system of any of claims 15-17, wherein the system is a rear bumper system.

Embodiment 19

The bumper system of any of claims 15-18, wherein the system is a front underrun protection system.

Embodiment 20

The bumper system of any of claims 15-19, wherein the central area comprises a cross-sectional geometry comprising a box section, a triangular section, or a combination comprising at least one of the foregoing.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention. The endpoints of all ranges directed to the same component or property are inclusive and independently combinable (e.g., ranges of "less than or equal to 25 wt %, or 5 wt % to 20 wt %," is inclusive of the endpoints and all intermediate values of the ranges of "5 wt % to 25 wt %," etc.). Disclosure of a narrower range or more specific group in addition to a broader range is not a disclaimer of the broader range or larger group. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." The suffix "(s)" as used herein is intended to include both the singular and the plural of the term that it modifies, thereby including one or more of that term (e.g., the film(s) includes one or more films). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

The modifier "about" used in connection with a quantity is inclusive of the stated value and has the meaning dictated by the context (e.g., includes the degree of error associated with measurement of the particular quantity). The notation "±10%" means that the indicated measurement can be from an amount that is minus 10% to an amount that is plus 10% of the stated value. The terms "front", "back", "bottom", and/or "top" are used herein, unless otherwise noted, merely for convenience of description, and are not limited to any one position or spatial orientation. "Optional" or "optionally" means that the subsequently described event or circumstance can or cannot occur, and that the description includes instances where the event occurs and instances where it does not. Unless defined otherwise, technical and scientific terms used herein have the same meaning as is commonly understood by one of skill in the art to which this invention belongs. A "combination" is inclusive of blends, mixtures, alloys, reaction products, and the like.

Unless otherwise specified herein, any reference to standards, regulations, testing methods and the like, such as RCAR and ECE R42 refer to the standard, regulation, guidance or method that is in force at the time of filing of the present application.

All cited patents, patent applications, and other references are incorporated herein by reference in their entirety. However, if a term in the present application contradicts or conflicts with a term in the incorporated reference, the term from the present application takes precedence over the conflicting term from the incorporated reference While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

We claim:

1. A beam configured to couple to a vehicle, comprising:
a first end area comprising a first end midpoint equidistant from a top face and a bottom face on a vertical axis when the beam is positioned on the vehicle;
a second end area comprising a second end midpoint equidistant from the top face and the bottom face on the vertical axis when the beam is positioned on the vehicle;
a central area positioned between the first end area and the second end area, the central area having a central area midpoint that is equidistant from the top face and the bottom face on the vertical axis when the beam is positioned on the vehicle and that is positioned in the center of the beam along a longitudinal axis;
an inner surface; and
an outer surface;
wherein the longitudinal axis of the beam passes through the first end area and the second end area;
wherein the central area is capable of rotating about the longitudinal axis when the beam is impacted by an applied force; and
wherein the central area is vertically offset from the end areas such that the central area midpoint is located at a point on the beam that is lower or higher than the end area midpoints.

2. The beam according to claim 1, wherein a cross-section portion of the beam taken along a line from the inner surface to the outer surface varies along the length of the beam.

3. The beam according to claim 1, wherein the central area comprises a cross-sectional geometry comprising a box section, a triangular section, or a combination comprising at least one of the foregoing.

4. The beam according to claim 1, wherein the beam has a width that varies along the length of the beam.

5. The beam according to claim 1, wherein at least one end area has a greater width than the width of the central area when measured from the inner surface to the outer surface at a point along the longitudinal axis.

6. The beam according to claim 1, wherein the beam comprises a thermoplastic polymer, a glass mat thermoplastic polymer, a thermoset, a composite, a metallic material, a metallic plastic hybrid, or a combination comprising at least one of the foregoing.

7. The beam according to claim 6, wherein the beam comprises a thermoplastic polymer.

8. The beam according to claim 7, wherein the thermoplastic polymer is selected from acrylonitrile-butadiene-styrene; polybutylene terephthalate; polycarbonate; copolycarbonate-polyesters; acrylic-styrene-acrylonitrile; acrylonitrile-(ethylene-polypropylene diamine modified)-styrene; phenylene ether polymers; polyamides; phenylene sulfide polymers; polyvinyl chloride; polystyrene; polyethylene; polypropylene; thermoplastic olefins, or a combination comprising at least one of the foregoing.

9. The beam according to claim 8, wherein the thermoplastic polymer is a blend of polycarbonate and polybutylene terephthalate.

10. The beam according to claim 1, wherein the beam is configured to attach to a rear of a vehicle to absorb energy upon impact.

11. The beam according to claim 1, wherein the beam is configured to attach to a front of a vehicle to absorb energy upon impact.

12. A bumper system comprising:
a beam according to claim 1; and
optionally a fascia.

13. The bumper system of claim 12, wherein the beam comprises a thermoplastic polymer, a glass mat thermoplastic polymer, a thermoset, a composite, a metallic material, a metal plastic hybrid, or a combination comprising at least one of the foregoing.

14. The bumper system of claim 12, wherein the system is a front bumper system.

15. The bumper system of claim 12, wherein the system is a rear bumper system.

16. The bumper system of claim 12, wherein the system is a front underrun protection system.

17. The bumper system of claim 12, wherein the central area comprises a cross-sectional geometry comprising a box section, a triangular section, or a combination comprising at least one of the foregoing.

* * * * *